United States Patent [19]
Rahman

[11] 3,806,610
[45] Apr. 23, 1974

[54] METHOD FOR MAKING A COMPRESSED, FREEZE-VACUUM-DEHYDRATED BLUEBERRY PRODUCT OF INCREASED DENSITY

[75] Inventor: Abdul R. Rahman, Natick, Mass.

[73] Assignee: The United States of America as represented by the Secretary of the Army, Washington, D.C.

[22] Filed: Mar. 31, 1971

[21] Appl. No.: 129,982

Related U.S. Application Data

[63] Continuation-in-part of Ser. No. 857,216, Sept. 11, 1969, abandoned.

[52] U.S. Cl............ 426/262, 426/267, 426/335, 426/385, 426/454, 426/464, 426/512
[51] Int. Cl............................................ A23b 7/02
[58] Field of Search ............ 99/100, 103, 104, 199, 99/204

[56] References Cited
UNITED STATES PATENTS

| | | | |
|---|---|---|---|
| 2,899,319 | 8/1959 | Powers | 99/204 |
| 3,102,820 | 9/1963 | Barton | 99/204 |
| 3,174,869 | 3/1965 | Roberts | 99/204 |
| 3,235,391 | 2/1966 | Dorsey | 99/204 |
| 3,356,512 | 12/1967 | Lemaire | 99/204 |
| 3,431,112 | 3/1969 | Durst | 99/204 |
| 3,554,766 | 1/1971 | Engel | 99/204 |
| 3,385,715 | 5/1968 | Ishler | 99/204 |
| 3,705,814 | 12/1972 | Rahman et al. | 99/204 |

OTHER PUBLICATIONS

Food Engineering, 5/66, pp. 52-56, and 68, Lawler "Military Creates New Foods."

Primary Examiner—Norman Yudkoff
Assistant Examiner—Martin G. Mullen
Attorney, Agent, or Firm—Edward J. Kelly; Herbert Berl; Charles C. Rainey

[57] ABSTRACT

Method for making compressed, freeze-vacuum-dehydrated blueberries comprising the steps of sulfiting to effect a sulfite content therein after dehydration of about 750–1250 ppm, freeze-vacuum-dehydrating to a moisture content of about 0–5% by weight, heating at a temperature of about 150°–280°F for about 1–5 minutes and compressing at a pressure of about 100–2,500 psi to increase the density thereby from about six-fold to about 14-fold over the density of said freeze-vacuum-dehydrated blueberries prior to compression thereof.

5 Claims, No Drawings

METHOD FOR MAKING A COMPRESSED, FREEZE-VACUUM-DEHYDRATED BLUEBERRY PRODUCT OF INCREASED DENSITY

This application is a Continuation-in-Part of my U.S. patent application Ser. No. 857,216, filed 11 Sept. 1969, for "Compacted, Freeze-Dried Fruit And Method Of Making Same," now abandoned.

This invention relates to compacted, dehydrated cherries and blueberries and to a method of preparing such products.

Freeze-vacuum-dehydration of food products is well known as a procedure for preserving such products as well as a method of reducing the weight thereof. This procedure is of particular importance for military operations since it is desirable to eliminate insofar as possible all need for refrigeration equipment for preserving foods as well as to reduce the weight of foods which have to be carried by the foot soldier. However, since freeze-vacuum-dehydration does not result in any appreciable reduction in volume or increases in densities of foods, it has become increasingly important to compact freeze-vacuum-dehydrated foods so that they will occupy less space as well as being lighter in weight than the natural foods or foods that have been preserved by canning methods or by processing in flexible containers without dehydration. Compaction of freeze-vacuum-dehydrated foods by compression thereof, however, generally results in crumbling or shattering of the food unless moisture or a moisture-mimetic-material is added to the food prior to compression. Such a procedure is described in Ishler et al U.S. Pat. No. 3,385,715. However, such a procedure requires a supplementary process step, usually freeze-vacuum-dehydration, to remove the moisture or other material added. Furthermore, this procedure cannot be successfully applied to the compaction of fruits having high sugar contents, such as cherries or blueberries, since the added moisture or moisture-mimetic material causes such fruits to stick in the press and thus present an intolerable production problem.

It is, therefore, an object of the present invention to provide compacted, dehydrated cherries and blueberries which will be readily and quickly rehydratable and which, upon being rehydrated, will be restored essentially to the whole, unshattered form in which they existed prior to being dehydrated and compacted.

Another object is to provide a method of making compacted, dehydrated cherries and blueberries characterized as above.

Other objects and advantages will become apparent from the following description of the invention.

One aspect of this invention relates to my discovery that the addition of moisture or a moisture-mimetic material to freeze-vacuum-dehydrated foods prior to compression thereof is not necessary in all cases to avoid shattering of the food. A compressed food product which is shattered tends to produce a mushy product upon reconstitution. I have found that certain fruits which in the fresh state contain more than about 10 percent sugar by weight may be compressed to a great extent without the addition of moisture or a moisture-mimetic material after freeze-vacuum-dehydration thereof when heated in an oven or other suitable apparatus at temperatures of from about 150°F. to about 280°F. for varying periods of time, depending on the temperature employed, to produce compacted products of relatively high densities which, when rehydrated, return to a condition quite similar to the condition of the fruit products prior to freeze-vacuum-dehydration and in which the fruits are to a very large degree present in the form of whole, unshattered fruits. They are not mushy as in jams or preserves, but rather resemble canned, whole fruits, such as canned, whole, pitted cherries or canned, whole blueberries, which are frequently used for making the fillings of cherry pies or blueberry pies.

I have found it to be preferable to heat the freeze-vacuum-dehydrated fruit at a temperature of from about 200°F. to about 250°F. for about one minute immediately prior to compression thereof. This combination of temperature and time is particularly suitable for a continuous process. However, the upper limit of the temperature will depend largely on the tendency of the freeze-vacuum dehydrated fruit to discolor at elevated temperatures and the time the fruit is exposed to the elevated temperature. About 280°F. has been found to be the maximum temperature at which freeze-vacuum-dehydrated fruits, such as pitted cherries and blueberries, may be heated for compression without causing appreciable discoloration of the skin portions of the reconstituted fruits. The oven temperature may be as low as about 150°F., but of course as the oven temperature is reduced, the time of exposure of the fruit to the heat must be increased in order to permit sufficient time for the heat to be conducted through to the center of the fruit before it is compressed. For example, at an oven temperature of about 150°F., heating for a period of about 5 minutes is required. If the individual fruits are not heated throughout, they will crumble when compressed. Hence, the time during which the fruit is exposed to a heated environment must be correlated with the temperature of the environment in order to produce the degree of plasticity needed in the freeze-dried fruit.

I have found that pressures of from about 100 to about 2,500 pounds per square inch are satisfactory for compressing the heated, freeze-vacuum-dehydrated fruits to produce an acceptable compacted product. Pressures below 100 pounds per square inch do not produce sufficiently high compression ratios or densities for practical purposes, while pressures above 2,500 pounds per square inch generally result in products which are so highly compacted that they do not rehydrate rapidly or completely enough to be acceptable. If pressures much above 2,500 pounds per square inch are used, some of the fruits will remain flat and incompletely rehydrated even after a very long rehydration time. From the practical standpoint, it is preferred that a compression ratio of at least about 6:1 be obtained in practicing the invention to justify the additional process steps required for compression. In other words, it is preferred that the freeze-dried fruit be compressed sufficiently to increase its density at least about six-fold or to at least a value of about 0.6 gram per cubic centimeter. However, compression ratios as great as about 14:1 have been obtained while producing compacted, freeze-dried cherries which rehydrate satisfactorily to produce acceptable cherry pies. When the volumes of compressed, freeze-vacuum-dehydrated cherries and loose frozen cherries are compared, it is possible to obtain a compression ratio as high as about 17:1. The preferred pressure range from a practical standpoint is from about 200 p.s.i. to about 400 p.s.i. since at these pressures the compaction has almost attained the maximum possible for acceptable compacted freeze-dried cherries or blueberries and has reached a point of diminishing return for increasing increments of pressure. This will be apparent in the examples below. Hence, it is preferable that the compressed freeze-dried cherries or blueberries have bulk densities in the range from about 0.9 to about 1.1 grams per cubic centimeter, although fruits having bulk densities as high as about 1.4 grams per cubic centimeter have been found to rehydrate well and to produce acceptable pies from the reconstituted fruits, especially in the case of freeze-vacuum-dehydrated cherries.

The invention is particularly applicable to dehydrated fruit products of the types described above which have been dehydrated to moisture contents appreciably less than they normally have as fresh fruits, for example, to moisture contents below about 5.0 percent by weight. However, the invention is effective for application to freeze-vacuum-dehydrated fruits having less than about 2.0 percent moisture by weight. These products are the most stable in the absence of refrigeration but are most likely to shatter if compressed while heated at temperatures below about 150°F. and without the addition of moisture or moisture-mimetic material.

It has been found to be generally desirable to treat the fruit with a sulfiting solution prior to compression thereof to minimize discoloration of the fruit during subsequent processing. If fresh fruit is used, the sulfiting treatment is conveniently applied just before the freezing of the fruit preparatory to freeze-vacuum-dehydration thereof. If frozen fruit is used, as is sometimes done for convenience, the frozen fruit may be treated with the sulfiting solution either in the frozen state or partially thawed. The sulfiting solution may comprise any of several known sulfiting compounds such as sodium metabisulfite, potassium metabisulfite, sodium sulfite, potassium sulfite, calcium sulfite, sulfurous acid, and liquid sulfur dioxide. Sufficient edible sulfite or bisulfite should be applied to the fruit to obtain a dehydrated fruit product having a sulfite content of about 1,000±250 parts per million by weight calculated as sulfur dioxide.

It has been found to be generally desirable to subject fresh cherries to a pitting operation prior to the sulfiting thereof. In most cases, commercially frozen cherries are subjected to a pitting operation prior to being frozen.

It has also been found to be generally desirable to subject blueberries to a slitting of the skin prior to freeze-drying thereof. The slitting is preferably carried out on frozen blueberries. The slitting of the skin of the blueberries assists in the impregnation of the blueberries with a sulfiting solution and in the subsequent freeze-vacuum-dehydration of the sulfited blueberries.

In general, it is desirable for the compressed, dehydrated fruit to have a rehydration ratio at least equal to about 70 percent of the rehydration ratio of the uncompressed, dehydrated fruit. The rehydration ratio is defined as the ratio of the weight of the rehydrated fruit to the weight of the dehydrated fruit and is, therefore, an indicator of the extent to which the compressed dehydrated fruit can be readily rehydrated to essentially the same form as it was in prior to dehydration.

Having described in general terms the conditions under which the compacted, freeze-vacuum-dehydrated fruit food products of the present invention are prepared, I will now proceed to disclose specific examples of the production of compacted, freeze-vacuum-dehydrated fruits in accordance with the above-described principles and of the use of such compacted freeze-vacuum-dehydrated fruits.

It will be understood, of course, that the above-described and other advantages of my invention may also be accomplished by suitable variations of the detailed method steps, about to be set forth below, which are intended to be for illustrative purposes, and not for the purpose of limiting the scope of my invention.

EXAMPLE I

Individually quick frozen red tart pitted (RTP) cherries, obtained from a commercial source, were sulfited by dipping in a solution of 4.0 ounces of sodium metabisulfite in 7.0 gallons of water for one minute, then draining for two minutes, to give sulfited cherries which produced freeze-vacuum-dehydrated cherries having approximately 1,000±250 parts per million by weight of sodium metabisulfite therein calculated as sulfur dioxide. The sulfited cherries were placed in a single layer on trays and freeze-vacuum-dehydrated over a period of approximately 16 hours employing a shelf temperature of approximately 125°F. for supplying the heat of sublimation to the frozen cherries resting thereon. The freeze-dried cherries having a moisture content of approximately 2.0 percent by weight and a bulk density of 0.10 gram per cubic centimeter were heated in the dry state in an oven preheated to a temperature of 200°F. over a period of one minute. The heated cherries were then immediately compressed in a hydraulic press employing pressures shown in Table 1 with a dwell time of about 5 seconds to produce discs approximately 3 ⅝ inches in diameter, about one-half inch thick, weighing approximately 3.5 ounces and having bulk density values, compression ratios, and rehydration ratios as shown in Table 1.

TABLE 1

| Compression Pressure (lbs. per sq. in.) | Bulk Density (gm/cc) | Compression Ratios Calculated from Bulk Densities | Rehydration Ratios |
| --- | --- | --- | --- |
| 0 | 0.10 | — | 2.8 |
| 100 | 0.91 | 9.1 | 2.4 |
| 200 | 1.03 | 10.3 | 2.3 |
| 400 | 1.06 | 10.6 | 2.1 |
| 800 | 1.14 | 11.4 | 2.1 |
| 1000 | 1.21 | 12.1 | 2.0 |
| 1500 | 1.27 | 12.7 | 2.0 |

The discs of compressed freeze-dried cherries were rehydrated by boiling for 2 to 3 minutes in approximately three cups of water for each disc, then permitting them to stand for 30 minutes. The rehydrated cherries were then used to produce cherry pie fillings in accordance with a commercial recipe for making cherry pie filling from reconstituted freeze-dried cherries and the filling prepared from each disc was used in making a 9-inch diameter pie. The pies were served to an expert technological panel trained in quality testing of foods. Cherry pies were prepared and tested in a similar manner using cherry pie filling prepared from uncompressed freeze-dried cherries from the same batch of cherries as that from which the compressed freeze-dried cherries were prepared. The results of the quality testing of the cherry pies prepared from the compressed freeze-dried cherries and the uncompressed freeze-dried cherries are presented in Table 2, the ratings being based on the so-called "hedonic" scale wherein a rating is given from 1 to 9, a rating of 1 representing "dislike extremely" and a rating of 9 representing "like extremely," and ratings in between representing various gradations between these two extremes, a rating of 5.0 being generally considered as the borderline of acceptability.

TABLE 2

Average Hedonic Scale Ratings (Technological Panel) of Cherry Pies Prepared from Compressed RTP Cherries

| Criteria | Compression Pressure Pounds Per Square Inch | | | | | | |
|---|---|---|---|---|---|---|---|
|  | 0 | 100 | 200 | 400 | 800 | 1000 | 1500 |
| Flavor | 6.6 | 6.1 | 6.3 | 6.3 | 5.8 | 6.6 | 6.0 |
| Texture | 6.4 | 6.0 | 5.8 | 6.1 | 5.5 | 6.1 | 6.0 |
| Appearance | 6.4 | 5.9 | 6.0 | 6.6 | 5.4 | 6.6 | 5.7 |

It is apparent that the cherry pies prepared from the compressed freeze-dried cherries scored almost as well as the uncompressed cherries in most instances and even better in certain respects and that in all respects they were found to be quite acceptable, i.e. having hedonic scale ratings above 5.

EXAMPLE II

Individually quick frozen blueberries, obtained from a commercial source, were slitted and then sulfited in the same manner as the cherries in Example I, then frozen and freeze-vacuum-dehydrated in substantially the same manner as the cherries in Example I. The freeze-dried blueberries, having a moisture content of approximately 2.0 percent by weight and a density of 0.12 gram per cubic centimeter, were heated in the dry state in an oven preheated to a temperature of 200°F. over a period of one minute. The heated blueberries were then immediately compressed in a hydraulic press employing pressures shown in Table 3 with a dwell time of about 5 seconds to produce discs approximately 3⅝ inches in diameter, about five-eighths inch thick, weighing approximately 3.5 ounces and having bulk density values, compression ratios, and rehydration ratios as shown in Table 3.

TABLE 3

| Compression Pressure (lbs. per sq. in.) | Bulk Density (gm/cc) | Compression Ratios Calculated from Bulk Densities | Rehydration Ratios |
|---|---|---|---|
| 0 | .12 | — | 3.1 |
| 100 | 0.70 | 5.8 | 2.9 |
| 200 | 0.87 | 7.2 | 3.0 |
| 400 | 0.94 | 7.8 | 2.9 |
| 800 | 1.11 | 9.2 | 2.9 |
| 1000 | 1.11 | 9.2 | 3.0 |
| 1500 | 1.17 | 9.7 | 3.1 |

The discs of compressed freeze-dried blueberries were rehydrated by boiling for 2 to 3 minutes in approximately 3 cups of water per disc, then permitting them to stand for 30 minutes. The rehydrated blueberries were whole and very similar in appearance to the blueberries prior to freeze-vacuum-dehydration and compression. Their flavor was quite good when eaten alone or when they were used for making blueberry pies.

The rehydrated blueberries were made into blueberry pie fillings in accordance with a commercial recipe for making blueberry pie filling from reconstituted freeze-dried blueberries and the filling prepared from each disc was used in making a 9-inch diameter pie. The pies were served to an expert technological panel trained in quality testing. Blueberry pies were prepared and tested in a similar manner using blueberry pie filling prepared from uncompressed freeze-dried blueberries from the same batch of blueberries as that from which the compressed freeze-dried blueberries were prepared. The results of the quality testing of the blueberry pies prepared from the compressed freeze-dried blueberries and the uncompressed freeze-dried blueberries are presented in Table 4, the hedonic scale ratings being based on criteria and scorings therefor as in Example I.

TABLE 4

Average Hedonic Scale Ratings (Technological Panel) of Blueberry Pies Prepared From Compressed Blueberries

| Criteria | Compression Pressure Pounds Per Square Inch | | | | | | |
|---|---|---|---|---|---|---|---|
|  | 0 | 100 | 200 | 400 | 800 | 1000 | 1500 |
| Flavor | 6.8 | 6.8 | 6.7 | 7.0 | 6.3 | 7.1 | 6.7 |
| Texture | 6.5 | 6.6 | 6.8 | 6.6 | 6.5 | 6.7 | 6.6 |
| Appearance | 7.2 | 7.1 | 7.3 | 7.1 | 7.2 | 7.1 | 7.3 |

It is apparent that the blueberry pies prepared from the compressed freeze-dried blueberries scored almost as well as those prepared from the uncompressed blueberries in most instances and even better in certain respects and that in all respects they were found to be quite acceptable, i.e., having hedonic scale ratings above 5.

While the invention has been described above as being applicable to fruits which in the fresh state contain more than about 10 percent sugar by weight, it is to be understood that natural fruits may in some cases contain as much as 20 percent sugar by weight and that the invention is applicable to such fruits or even to fruits containing still higher percentages of sugar in the natural state or as a result of impregnation thereof with sugar solutions followed by dehydration.

I have described my invention in relation to tests and criteria for determining the acceptability of foods by members of the Armed Forces. It is not inconceivable that some civilians might be content with a lesser degree of rehydration of freeze-dried cherries or blueberries. It is to be understood, therefore, that my invention may be practiced at even higher pressures with the resultant attainment of higher bulk densities than the maximum values of the conditions and characteristics heretofore stated would produce if one is willing to accept a lower rehydration ratio or if one wishes to go to the extra expense involved in processing at progressively higher pressures. Furthermore, the enjoyment of food varies from individual to individual; hence, it is possible that even the most highly compacted freeze-dried cherries or blueberries prepared in accordance with the present invention may be acceptable to a number of persons when reconstituted and consumed directly or converted into various other food products, such as pies, cherry tarts, cherry ice cream, blueberry muffins, or the like.

Although I do not wish my invention to be limited by any theory as to the reason for its working, I believe that the success of the method with certain fruits is due to the high natural sugar contents of these fruits. On the other hand, vegetables such as peas, beans, corn and other vegetables as well as some fruits, and most meats contain relatively low quantities of natural sugar and, therefore, require the addition of moisture or a moisture-mimetic material for compression without shattering. I believe that the sugar occurring naturally in certain fruits in relatively large amounts behaves as a plasticizer at elevated temperatures even when the moisture content of the fruit is very low, as in the cases of freeze-dried cherries or blueberries, permitting compaction of such freeze-dried fruits without shattering them, as described above.

The present invention has the advantage over prior art methods of compacting dehydrated fruits having high sugar content in that it does not require addition of moisture or a moisture-mimetic material to the dehydrated food prior to compression thereof and that it, therefore, does not require a second dehydration step or other procedure to remove the moisture or moisture-mimetic material added to the dehydrated food to assist in the compression thereof. This results in an appreciably less expensive method than the prior art provides for producing highly compacted, dehydrated fruit products which are capable of being rapidly reconstituted to the whole fruit form that is much to be desired for fruit pie fillings, especially for cherry pies and blueberry pies. It furthermore has the advantage over the prior art method of compacting dehydrated fruits containing substantial quantities of sugar in that the highly compacted fruit products do not stick or adhere to the press in which compression is carried out. Consequently, well-shaped discs or blocks having smooth sides and faces come out of the presses or molds, thus contributing to uniformity in portion control and speed in producing the highly compacted discs or blocks of dehydrated fruits.

An important advantage of my invention is that, with pressures of about 200 to 400 p.s.i. employed in compressing freeze-dried cherries, enough cherries can be packed in a single No. 2½ can in the form of eight compressed discs to make eight 9-inch cherry pies; whereas prior to my invention, a No. 2½ can would hold just enough freeze-dried cherries to make a single 9-inch cherry pie. Similarly, as a result of my invention, when freeze-dried blueberries are compressed at about 200 to 400 p.s.i., enough blueberries can be packed in a single No. 2½ can in the form of seven compressed discs to make seven 9-inch blueberry pies; whereas prior to my invention, a No. 2½ can would hold just enough freeze-dried blueberries to make a single 9-inch blueberry pie. If maximum advantage were taken of the compression ratios shown in the examples, it would be possible to package more of the compressed cherries or blueberries in a container of a given capacity. However, due to the headspace that must be left in each can and the space that must be left between the compressed discs and the wall of the can, in addition to the space between discs caused by unevenness of the surfaces of the discs, it is impractical to pack discs in cans in the same ratio as the compression ratios would suggest to be possible. Nevertheless, there is a great saving in space occupied in transportation and storage as a result of my invention. Naturally, the maximum conservation of space will be obtained by compressing the freeze-dried fruit into rectangular parallelepipeds rather than discs or other forms having curved surfaces.

I wish it to be understood that I do not desire to be limited to the exact details described, for obvious modifications will occur to a person skilled in the art.

I claim:

1. A process of treating blueberries to make a compressed, freeze-vacuum-dehydrated blueberry product which upon rehydration with water produces unshattered, whole blueberries, substantially indistinguishable from the whole blueberries prior to freeze-vacuum-dehydration and compression thereof, which consists of the steps of:
   a. treating the blueberries with an aqueous sulfiting solution comprising sufficient water-soluble sulfite or bisulfite to incorporate in the blueberries after dehydration thereof a sulfite content of about 750 to about 1,250 parts per million by weight calculated as sulfur dioxide,
   b. separating the sulfited blueberries from said sulfiting solution,
   c. freeze-vacuum-dehydrating the sulfited blueberries to a moisture content of from about zero to about 5.0 percent by weight, d. heating the freeze-vacuum-dehydrated blueberries at a temperature of from about 150°F. to about 280°F. for a period of from about one minute to about five minutes to make the heated freeze-vacuum-dehydrated blueberries thermoplastic, and e. compressing the heated, freeze-vacuum-dehydrated blueberries at a pressure of from about 100 to about 2,500 pounds per square inch for a time sufficient to increase the density of said freeze-vacuum-dehydrated blueberries to from about six-fold to about 14-fold over the density of said freeze-vacuum-dehydrated blueberries prior to compression thereof.

2. A process as set forth in claim 1, wherein said sulfited blueberries are freeze-vacuum-dehydrated to a moisture content of from about zero to about 2.0 percent by weight prior to the steps of heating and compressing said freeze-vacuum-dehydrated blueberries.

3. A process as set forth in claim 2, wherein said step of heating said freeze-vacuum-dehydrated blueberries is carried out at a temperature of from about 200°F. to about 250°F.

4. A process as set forth in claim 3, wherein said step of heating said freeze-vacuum-dehydrated blueberries at a temperature of from about 200°F. to about 250°F. is carried out over a time period of about 1 minute.

5. A process as set forth in claim 4, wherein said step of compressing said heated, freeze-vacuum-dehydrated blueberries is carried out at a pressure of from about 200 to about 400 pounds per square inch.

* * * * *